(12) United States Patent
Fukayo (10) Patent No.: US 7,975,606 B2
(45) Date of Patent: Jul. 12, 2011

(54) AUXILIARY DEVICE FOR HARVESTING PASTURE

(76) Inventor: Mitsuharu Fukayo, Hokkaido (JP)

( * ) Notice: Subject to any disclaimer, the term of this patent is extended or adjusted under 35 U.S.C. 154(b) by 0 days.

(21) Appl. No.: 12/659,246

(22) Filed: Mar. 2, 2010

(65) Prior Publication Data

US 2010/0154662 A1  Jun. 24, 2010

Related U.S. Application Data

(63) Continuation of application No. PCT/JP2008/002461, filed on Sep. 5, 2008.

(30) Foreign Application Priority Data

Sep. 11, 2007  (JP) .................................. 2007-267193

(51) Int. Cl.
 *B30B 3/00* (2006.01)
 *A01D 82/02* (2006.01)
(52) U.S. Cl. ...................... 100/170; 100/171; 56/16.4 B
(58) Field of Classification Search .................. 100/100, 100/155 R, 169, 170, 171, 210; 56/16.4 A, 56/16.4 B
See application file for complete search history.

(56) References Cited

U.S. PATENT DOCUMENTS

| | | | |
|---|---|---|---|
| 2,001,078 A * | 5/1935 | Court .............................. | 56/13.5 |
| 2,985,079 A * | 5/1961 | Clapper .......................... | 404/86 |
| 3,516,235 A * | 6/1970 | Tanoue .......................... | 56/10.9 |
| 6,711,996 B1 * | 3/2004 | Mackie .......................... | 100/169 |

FOREIGN PATENT DOCUMENTS

| | | |
|---|---|---|
| JP | 54-15840 | 2/1979 |
| JP | 60-18462 | 1/1985 |
| JP | 64-41201 | 3/1989 |
| JP | 4-24900 Y2 | 6/1992 |
| JP | 5-227824 A | 9/1993 |
| JP | 7-31263 | 2/1995 |
| JP | 11-056083 | 3/1999 |
| JP | 3379798 B2 | 2/2003 |

OTHER PUBLICATIONS

Microfilm of the specification and drawings annexed to the request of Japanese Utility Model Application No. 137716/1987 [i.e., 62-137716] (Laid-Open No. 41201/1989) [i.e., 64-41201] (The Ohtsu Tire & Rubber Co., Ltd.) Mar. 13, 1989, Description, p. 2, lines 2 to 14; Fig. 7.
International Search Report (ISR) dated Dec. 9, 2008 in parent application No. PCT/JP2008/002461 (2 pgs.).

* cited by examiner

*Primary Examiner* — Jimmy T Nguyen
(74) *Attorney, Agent, or Firm* — Shlesinger, Arkwright & Garvey LLP (57) ABSTRACT

An auxiliary device for harvesting pasture prevents clogging at a roll baler to increase speed of harvesting pasture and decrease occurrence of troubles and enhance density of roll package. The auxiliary device for harvesting pasture includes tires having a predetermined width and weight as a rolling body, a holding portion to rotatably hold the tires, and an attaching portion to attach the holding portion to the front of a tractor which tows a roll baler. In the constitution of the auxiliary device for harvesting pasture, the attaching portion is attached to the front portion of the tractor and a line of collected grass is subject to rolling pressure by rolling of tires in accordance with movement of the tractor. Instead of the tires, a cylindrical body or a columnar body, or either one which is made in the form of metal cylindrical body or columnar body can be mounted.

9 Claims, 8 Drawing Sheets

AUXILIARY DEVICE FOR HARVESTING PASTURE

CROSS-REFERENCE TO RELATED APPLICATIONS

This application is a continuation of application no. PCT/JP2008/002461, filed 5 Sep. 2008, which claims the priority of Japanese application no. 2007-267193, filed 11 Sep. 2007, and each of which is incorporated herein by reference.

FIELD OF THE INVENTION

The present invention relates to an auxiliary device for harvesting pasture, which is mounted to the front portion of a tractor or to the rear portion of a grass collecting machine (rake). Particularly, the present invention relates to an auxiliary device for harvesting pasture to achieve an increase in speed of harvesting pasture, a decrease in occurrence of troubles, and high density in a roll package when using a roll baler which is a packaging machine for pasture.

BACKGROUND OF THE INVENTION

For dairy farmers in Hokkaido, how to finish harvesting operation in a short period of time is an important matter during a busy summer season when the amount of annual rough forage (pasture, silage, etc.) is yielded, particularly, because the yield of pasture is heavily affected by the weather.

The process of harvesting pasture consists of, for example, cutting with a mower conditioner, inverting pasture with a tedder, collecting pasture with a grass collecting machine (rake), and roll packaging with a roll baler.

In reality, however, using a roll baler which carries out roll packaging, particularly, makes harvesting operation inefficient due to frequent breaks. This is because the roll baler tends to collect grass excessively when there is a large amount of pasture and cause clogging at a chamber (suction opening) with grass when collecting more grass in a short period of time in case of rain.

As related art, JP 11-56083A describes a treatment of pasture before its drying on ground, in which the cell membranes of pastures are broken with physical pressures, hard stems and soft leaves are pressed to transpire water contained in the stems through the leaves, and the pressed pastures are put on stumps in continuous mat-like forms to dry the pasture with air from lower side.

JP 05-227824A describes a rotary rake device which is capable of performing grass collecting operation and grass packaging operation in its state connected to a tractor and a roll baler without performing reconnecting operation.

JP 60-18462A describes a vehicle such as a tractor which is capable of using both narrow and wide tires together and obtaining row ground pressure due to a wider ground contact area between wheels and a cultivated land.

JP 54-15840A describes a device for regrowing pasture mounted with a colter having a jagged blade on its circumference for crushing a surface of grass farm and cutting lateral roots, a body having a blade for crushing subsoil and a wing for digging to make better ventilation and passing of water by crushing the underground layer, and a roller for smoothing a raised surface of ground on which pasture is grown, to a frame having a wheel in order for a tractor to tow.

OBJECTS AND SUMMARY OF THE INVENTION

It is an object of the invention to overcome the drawbacks of the prior art.

As explained above, when harvesting pasture in a conventional method, a roll baler has faced difficulty smoothly taking in grass on a line of collected grass (a line of pasture raked with a grass collecting machine), leading to a break of operation caused by clogged pasture grass in case that there is a large amount of harvested grass or much grass must be collected depending on weather conditions in processes of cutting, inverting, collecting and roll packaging.

In order to prevent above mentioned problems, there is no choice but to lower density of collected grass, however, by which it takes longer time to harvest pasture, causing difficulty obtaining good quality due to high probability of returned moisture or rain since operations in the day time is delayed to the night or the following day.

The related art described above are not for solving the problems.

Harvesting pasture with good quality depends on how to improve efficiency of a set of operations.

In order to produce good-quality milk and beef, it is indispensable to secure obtaining good-quality pasture. Also, providing good self-supplied feed leads to an increase in the amount of producing food, prevention of diseases, and a decrease in costs to purchase feed, bringing about greatly positive economic effects. Thus, a solution to the above-mentioned problems is sought for.

In view of the actual status described above, an object of the present invention is to provide an auxiliary device for harvesting pasture to prevent clogging at a roll baler and achieve an increase in speed of harvesting pasture, a decrease in occurrence of troubles, and high density in a roll package.

The present invention provides the following constitution so that problems mentioned above are solved.

The invention provides an auxiliary device for harvesting pasture which includes a rolling body having a predetermined width and weight, a holding portion to rotatably hold the rolling body, and an attaching portion to attach the holding portion to the front portion of a tractor or the rear portion of a grass collecting machine, wherein a line of collected grass is subject to rolling pressure by rolling of the rolling body according to movement of the tractor or the grass collecting machine with the attaching portion being attached to the front portion of the tractor towing a roll baler or the rear portion of the grass collecting machine.

The invention provides the auxiliary device for harvesting pasture, wherein the rolling body comprises a plurality of tires in parallel.

The invention provides the auxiliary device for harvesting pasture, wherein the rolling body is formed in the shape of cylindrical body or columnar body.

The invention provides the auxiliary device for harvesting pasture, wherein the cylindrical body is made in the form of metal cylindrical body or the columnar body is made in the form of metal columnar body.

The invention provides the auxiliary device for harvesting pasture, wherein the holding portion has leg portions hanging at both ends thereof, respectively, and tires are rotatably mounted at the lower ends of the leg portions, and arm portions which swing in accordance with activation of a hydraulic hoist are swingably mounted at both ends of the holding portion and inside the leg portions, and the rolling body is rotatably supported on a shaft at both ends of the arm portions.

The invention provides the auxiliary device for harvesting pasture, wherein both arm portions are limited to swing within a predetermined extent by an elastic means.

The invention provides the auxiliary device for harvesting pasture, wherein a gauge to indicate a distance between the rolling body and the holding portion is mounted with the lower end portion being swingably disposed at the center of a spanning portion to span both the arm portions and the upper end portion slidably penetrating a gauge holding member mounted on the holding portion.

According to the present invention, grass on a line of collected grass can be taken in smoothly into a chamber of a roll baler by compressing with a rolling body such as a roller of tire immediately after collecting grass with a rake which is a grass collecting machine to reduce the volume and enhance the density.

The method mentioned above makes it possible to prevent break of operation caused by a clogged roll baler with grass that have negatively affected efficiency of harvesting pasture in the past, leading to achieving an increase in speed of harvesting pasture, a decrease in occurrence of troubles, and high density in a roll package, in addition, contribution to saving energy and to ecology.

Also, management costs can be saved significantly since the packaging capacity is increased by over 10 to 15% compared with a conventional size of roll.

Furthermore, the following effects are expected to happen;
Scattering of pasture can be prevented even when windy days.
Drying grass excessively can be prevented.
Vehicles including a tractor can smoothly pass through on a line of collected grass due to the decreased volume of the line of grass. In this case, troubles such as grass getting stuck cannot happen.
Less moisture is absorbed since the air does not smoothly pass through the line of grass.
When a forage harvester is used, taking in of grass into the forage harvester and cutting operation are facilitated, leading to high efficiency in operations with forage harvester.

BRIEF DESCRIPTION OF THE DRAWINGS

FIG. 5 (a) is a perspective view to show a status of a line of collected grass before being compressed with the auxiliary device for harvesting pasture in accordance with the first embodiment of the present invention;

FIG. 5 (b) is a perspective view to show a status of the line of collected grass after being compressed with the auxiliary device for harvesting pasture in accordance with the first embodiment of the present invention;

DETAILED DESCRIPTION OF THE INVENTION

Embodiments of the present invention will now be described with reference to the accompanying drawings.

Figure 1:
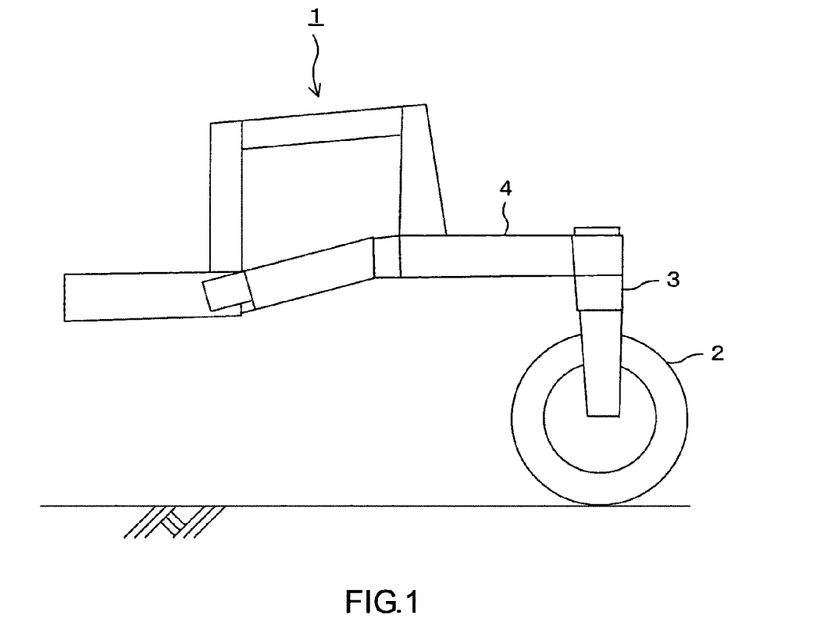
FIG. 1 is a side elevational view of an auxiliary device for harvesting pasture in accordance with a first embodiment of the present invention.
Figure 2:
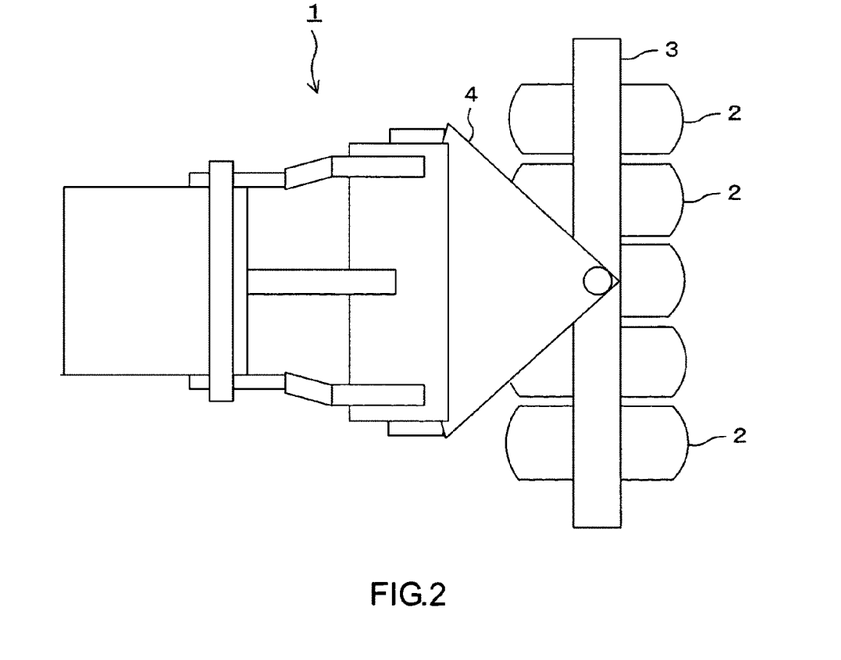
FIG. 2 is a plan view of the auxiliary device for harvesting pasture in accordance with the first embodiment of the present invention.

In FIG. 1 and FIG. 2, reference number 1 denotes an auxiliary device for harvesting pasture in accordance with a first embodiment of the present invention. The auxiliary device 1 for harvesting pasture is mounted with a plurality of tires 2 in parallel as a rolling body having a predetermined width and weight, and a holding portion 3 for rotatably holding the tires 2, and an attaching portion 4 for attaching the holding portion 3 to the front portion of a tractor (not shown).

Figure 3:
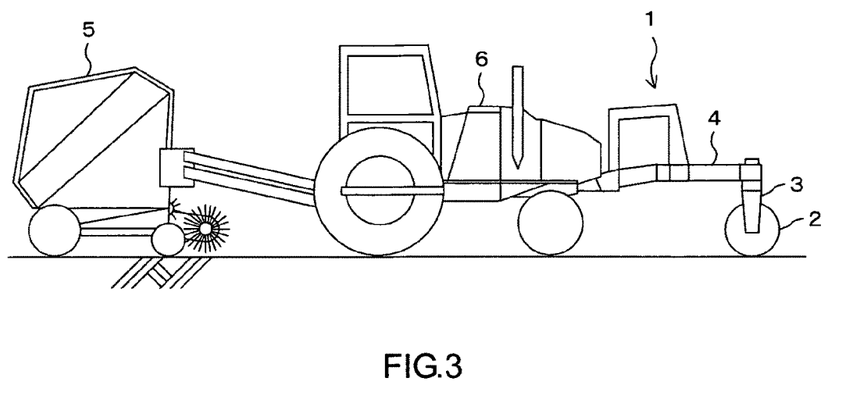
FIG. 3 is a side elevational view to show a status in which the auxiliary device for harvesting pasture in accordance with the first embodiment of the present invention is attached to the front portion of a tractor which tows a roll baler.
Figure 4:
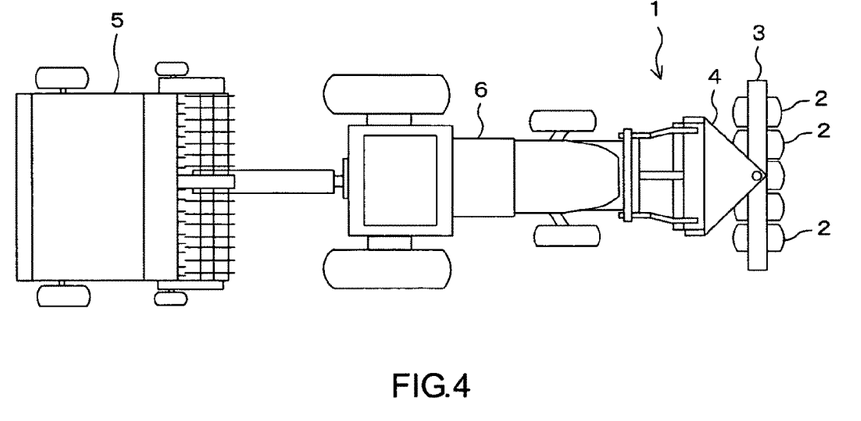
FIG. 4 is a plan view to show a status in which the auxiliary device for harvesting pasture in accordance with the first embodiment of the present invention is attached to the front portion of the tractor which tows the roll baler.

FIG. 3 and FIG. 4 show a status in which a tractor 6 is connected with the auxiliary device 1 for harvesting pasture by attaching the attaching portion 4 of the auxiliary device 1 for harvesting pasture to the front portion of the tractor 6 towing a roll baler 5. Although mounting to the front portion of a tractor 6 which does not tow a roll baler 5 is possible, it is better for operating efficiency to simultaneously carry out operations with the auxiliary device 1 for harvesting pasture and with the roll baler 5 in a row by mounting to the front of the tractor 6 towing the roll baler 5.

Thus, when the tractor 6 advances along a line of grass (refer to reference number 7 in FIG. 5) collected with a grass collecting machine (not shown) under the condition that the tractor 6 towing the roll baler 5 is connected with the auxiliary device 1 for harvesting pasture, a plurality of tires 2 of the auxiliary device 1 for harvesting pasture roll on, press and compress the line of collected grass so that the volume of grass is reduced (downsized) and the density thereof is enhanced.

Figure 5:
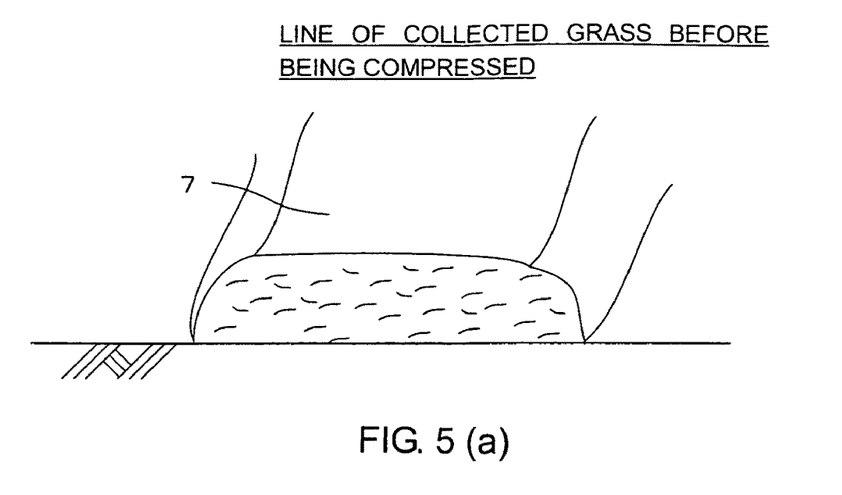

FIG. 5 (a) shows the status of a line of collected grass 7 before being compressed with the auxiliary device 1 for harvesting pasture. FIG. 5 (b) shows the line of collected grass 7 after being compressed with the auxiliary device 1 for harvesting pasture.

Next, the following roll baler 5 takes in pasture on the line of collected grass which has been compressed through a chamber and carries out roll packaging.

When the roll baler 5 takes in pasture on the line of collected grass through a chamber, the pasture on the line of collected grass is taken in smoothly without causing clogging at an opening of the roll baler 5 since the line has already been compressed and the volume thereof has been reduced. Thus, it is possible to achieve an increase in speed of harvesting pasture and roll packaging, and high density in a roll package, in addition, to reduce breaks or breakdown caused by troubles arising at the roll baler 5.

Figure 6:
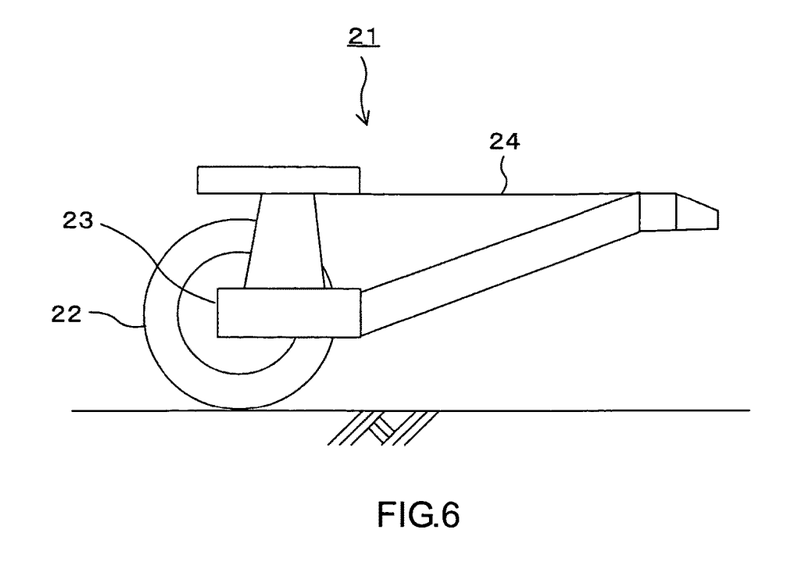
FIG. 6 is a side elevational view of an auxiliary device for harvesting pasture in accordance with a second embodiment of the present invention.
Figure 7:
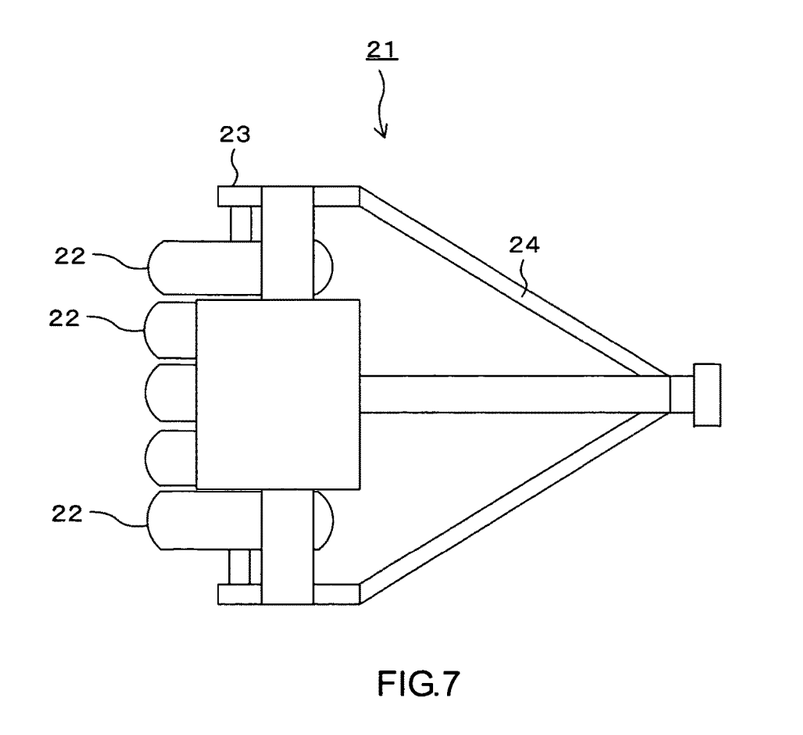
FIG. 7 is a plan view of the auxiliary device for harvesting pasture in accordance with the second embodiment of the present invention.

In FIG. 6 and FIG. 7, reference number 21 denotes an auxiliary device for harvesting pasture in accordance with a second embodiment of the invention. The auxiliary device 21 for harvesting pasture is mounted with a plurality of tires 22 in parallel as a rolling body having a predetermined width and weight, and a holding portion 23 for rotatably holding the tires 22, and an attaching portion 24 for attaching the holding portion 23 to the rear portion of a grass collecting machine.

Figure 8:
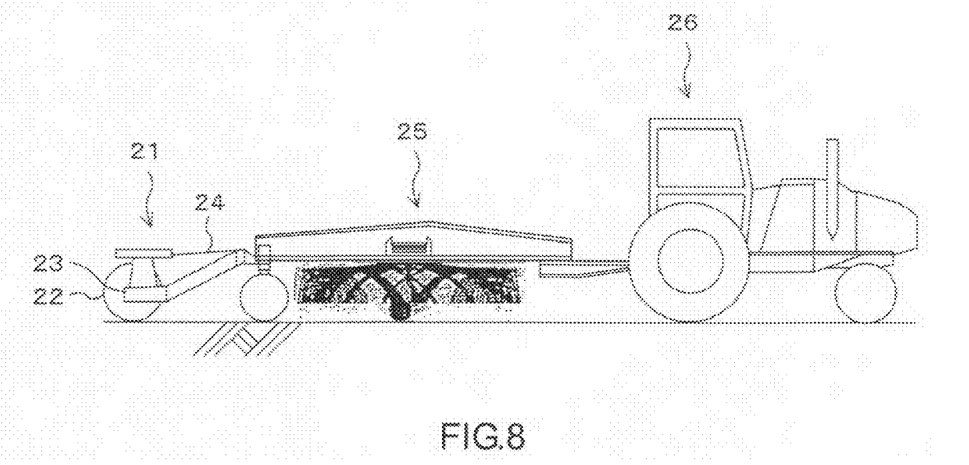
FIG. 8 is a side elevational view to show a status in which the auxiliary device for harvesting pasture in accordance with the second embodiment of the present invention is attached to the rear portion of a grass collecting machine.
Figure 9:
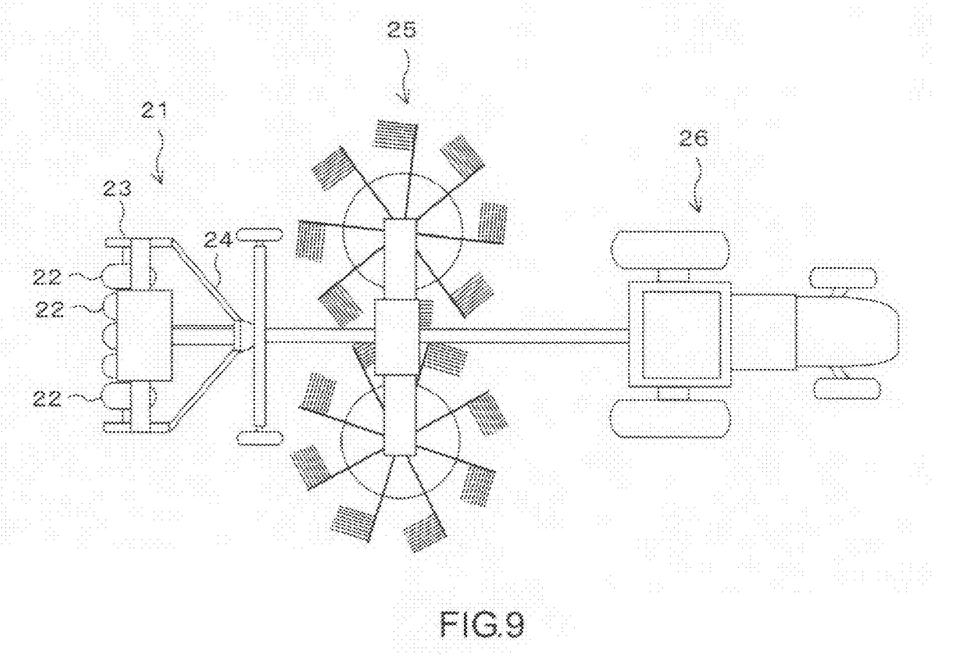
FIG. 9 is a plan view to show a status in which the auxiliary device for harvesting pasture in accordance with the second embodiment of the present invention is attached to the rear portion of the grass collecting machine.

FIG. 8 and FIG. 9 show a status in which a grass collecting machine 25 is connected with the auxiliary device 21 for harvesting pasture by attaching the attaching portion 24 of the auxiliary device 21 for harvesting pasture to the rear portion of the grass collecting machine 25 towed by a tractor 26.

Thus, when the tractor 26 advances and the grass collecting machine 25 is driven under the condition that the auxiliary device 21 for harvesting pasture is connected to the rear portion of the grass collecting machine 25 which is connected to the rear portion of the tractor 26, the grass collecting machine 25 collects the grass which has already been cut and makes it into a line.

And, a plurality of tires 22 of the auxiliary device 21 for harvesting pasture roll on, press and compress the line of collected grass so that the volume of grass is reduced and the density thereof is enhanced.

Next, without showing a figure, the following roll baler takes in pasture on the line of collected grass which has already been compressed and carries out roll packaging.

When the roll baler takes in pasture on the line of collected grass, the pasture is taken in smoothly without causing clogging at a chamber of the roll baler since the line has already been compressed and the volume thereof has been reduced. Thus, it is possible to achieve an increase in speed of harvesting pasture and roll packaging, and high density in a roll package, in addition, to reduce breaks or breakdown caused by troubles arising at the roll baler.

Figure 10:
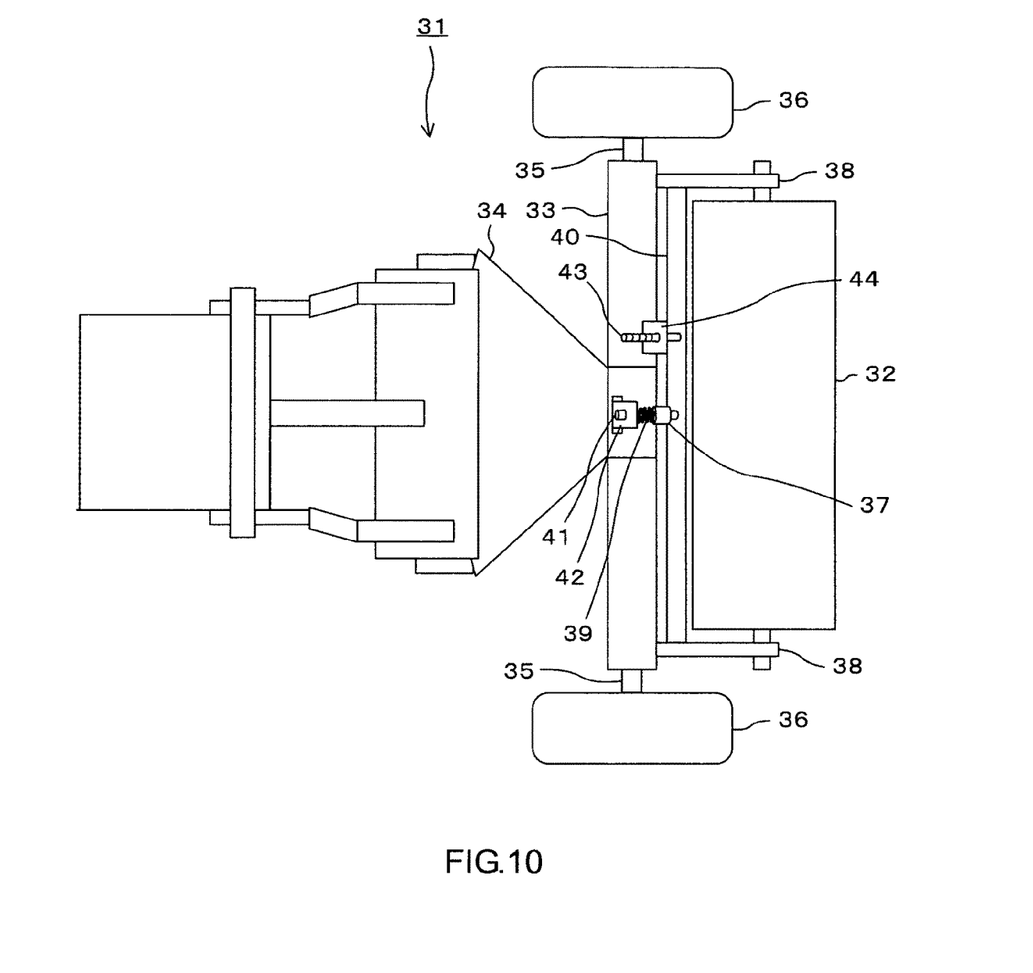
FIG. 10 is a plan view of an auxiliary device for harvesting pasture in accordance with a third embodiment of the present invention.

In FIG. 10, reference number 31 denotes an auxiliary device for harvesting pasture in accordance with a third embodiment of the invention. The auxiliary device 31 for harvesting pasture is mounted with a metal cylindrical body 32 instead of a plurality of tires in parallel (shown as reference number 2 in FIG. 2) as a rolling body of the auxiliary device for harvesting pasture (shown as reference number 1 in FIG. 2), and a holding portion 33 for rotatably holding the cylindrical body 32, and an attaching portion 34 for attaching the holding portion 33 to the front portion of a tractor (not shown).

The cylindrical body 32 is not limited to be made of metal but including synthetic resin, rubber, wood or one of those materials whose circumference is covered with metal plate, and not limited to be formed in the shape of cylinder but including columnar shape.

Figure 11:
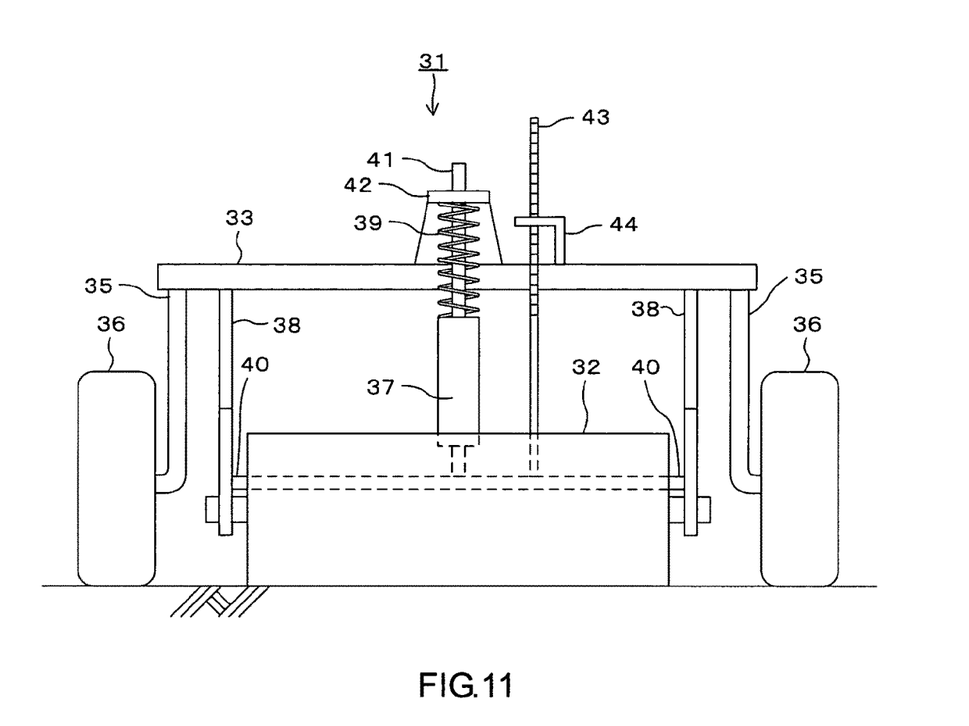
FIG. 11 is a front elevational view of the auxiliary device for harvesting pasture in accordance with the third embodiment of the present invention.

As shown in FIG. 11, the holding portion 33 of the auxiliary device 31 for harvesting pasture has leg portions 35 hanging at both ends thereof, respectively, and tires 36 are rotatably mounted at the lower ends of the leg portions 35, and arm portions 38 which swing with activation of a hydraulic hoist 37 are swingably mounted at both ends of the holding portion 33 and inside the leg portions 35, and the cylindrical body 32 is rotatably supported on a shaft at both ends of the arm portions 38.

Also, both arm portions 38 are limited to swing within a predetermined extent by a spring 39, which is an elastic means.

In further detail, the piston rod side of the hydraulic hoist 37 is swingably fixed at the center of a spanning portion 40 to span both arm portions 38. A bar 41, which coaxially extends from the cylinder side of the hydraulic hoist 37, is mounted with the upper end slidably penetrating a bar holding member 42 mounted on the holding portion 33. The spring 39, which is an elastic means and fixed by the hydraulic hoist 37 and the bar holding member 42 at both ends thereof, is disposed between the hydraulic hoist 37 and the bar holding member 42, holding the bar 41. In the constitution described above, preferably, a bottom dead point of up-and-down movement of the cylindrical body 32 is set at a point just before the cylindrical body 32 touches the ground.

Accordingly, although the arm portions 38 swing as the cylindrical body 32 moves upward, the swing is controlled by reaction force from the spring 39 and up-and-down movement of the cylindrical body 32 is controlled by reaction force. With the reaction force and the cylindrical body 32's own weight, the cylindrical body 32 can exert rolling pressure on a line of collected grass.

Also, a gauge 43 to indicate a distance between the cylindrical body 32 and the holding portion 33 is mounted with the lower end of portion being swingably mounted to the spanning portion 40, and the upper end portion slidably penetrating the gauge holding member 44 mounted on the holding portion 33.

When the spanning portion 40 moves up and down in accordance with up-and-down movement of the cylindrical body 32 against the holding portion 33, the gauge 43 also moves up and down. When the upper end of gauge 43 moves up and down on the gauge holding member 44, how much the cylindrical body 32 moves up and down can be read by a scale of the gauge 43 or a height thereof from the gauge holding member 44.

The auxiliary device 31 for harvesting pasture described in the third embodiment can be used with being attached to the front portion of a tractor towing a roll baler in the same way as the auxiliary device for harvesting pasture (shown as reference number 1 in FIG. 2).

Figure 12:
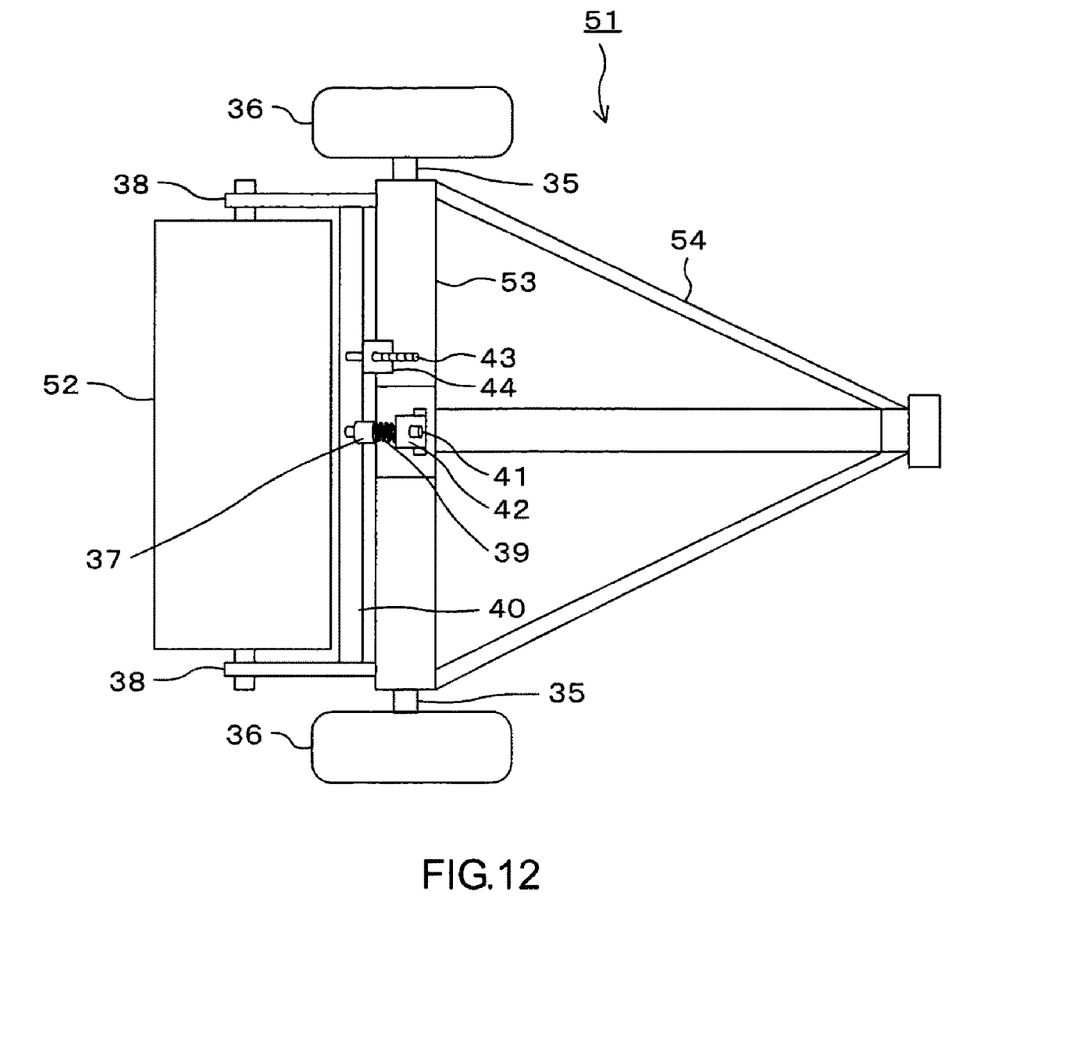
FIG. 12 is a plan view of an auxiliary device for harvesting pasture in accordance with a fourth embodiment of the present invention.

In FIG. 12, reference number 51 denotes an auxiliary device for harvesting pasture in accordance with a fourth embodiment of the present invention. The auxiliary device 51 for harvesting pasture is mounted with a metal cylindrical body 52 instead of a plurality of tires in parallel (shown as reference number 22 in FIG. 7) as a rolling body of the auxiliary device for harvesting pasture (shown as reference number 1 in FIG. 7), and a holding portion 53 for rotatably holding the cylindrical body 52, and an attaching portion 54 for attaching the holding portion 53 to the rear portion of a grass collecting machine.

In the same way as the cylindrical body (shown as reference number 32 in FIG. 10), the cylindrical body 52 is not limited to be made of metal but including synthetic resin, rubber, wood or one of those materials whose circumference is covered with metal plate, and not limited to be formed in the shape of cylinder but including columnar shape.

The auxiliary device 51 for harvesting pasture described in the fourth embodiment can be used with being attached to the rear portion of a grass collecting machine in the same way as the auxiliary device for harvesting pasture (shown as reference number 21 in FIG. 7)

The auxiliary device 51 for harvesting pasture in accordance with the fourth embodiment of the present invention is mounted with the tires 36, the hydraulic hoist 37, the spring 39, and the gauge 43, which are shown in FIG. 11 and mounted in the auxiliary device 31 for harvesting pasture in accordance with the third embodiment of the present invention, whereby the same advantages as described in the third embodiment can be obtained.

Also, the tires 36, the hydraulic hoist 37, the spring 39, and the gauge 43 shown in FIG. 11 can be mounted to the auxiliary devices 1, 21 for harvesting pasture in accordance with the first and second embodiments of the present invention in the same way as the auxiliary device 31 for harvesting pasture in accordance with the third embodiment of the present invention to obtain the same advantages as described in the third embodiment.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

DESCRIPTION OF SYMBOLS

1, 21, 31, 51: AUXILIARY DEVICE FOR HARVESTING PASTURE
2, 22, 36: TIRE
3, 23, 33, 53: HOLDING PORTION
4, 24, 34, 54: ATTACHING PORTION
5: ROLL BALER
6, 26: TRACTOR
7: LINE OF COLLECTED GRASS
25: GRASS COLLECTING MACHINE
32, 52: CYLINDRICAL BODY
35: LEG PORTION
37: HYDRAULIC HOIST
38: ARM PORTION
40: SPANNING PORTION
43: GAUGE
44: GAUGE HOLDING MEMBER

What is claimed is:

1. An auxiliary device configured for harvesting pasture, in combination with a tractor or a grass collecting machine, comprising:
   a) a rolling body having a predetermined width and a predetermined weight;
   b) a holding portion to rotatably hold the rolling body;
   c) an attaching portion to attach the holding portion to a front portion of the tractor or a rear portion of the grass collecting machine;
   d) the attaching portion being attached to the front portion of the tractor which tows a roll baler or the rear portion of the grass collecting machine and a line of collected grass is subject to rolling pressure by rolling of the rolling body according to movement of the tractor or the grass collecting machine;
   e) the rolling body is formed in one of the shapes of a cylindrical body or a columnar body;
   f) the cylindrical body is made in the form of metal cylindrical body or the columnar body is made in the form of a metal columnar body;
   g) the holding portion has leg portions hanging at both ends thereof, respectively;
   h) tires are rotatably mounted at the lower ends of the leg portions;
   i) arm portions which swing in accordance with activation of a hydraulic hoist are swingably mounted at both ends of the holding portion and inside of the leg portions; and
   j) the rolling body is rotatably supported on a shaft at both ends of the arm portions.

2. The auxiliary device for harvesting pasture according to claim 1, wherein:
   a) the rolling body includes a plurality of tires in parallel.

3. The auxiliary device for harvesting pasture according to claim 1, wherein:
   a) the paid arm portions are limited to swing within a predetermined extent by an elastic means.

4. The auxiliary device for harvesting pasture according to claim 3, wherein:
   a) a gauge to indicate a distance between the rolling body and the holding portion is mounted with the lower end portion being disposed at the center of a spanning portion to span both the arm portions and the upper end portion slidably penetrating a gauge holding member mounted on the holding portion.

5. An auxiliary device configured for harvesting pasture, in combination with a tractor or a grass collecting machine, comprising:
   a) a rolling body having a predetermined width and a predetermined weight;
   b) a holding portion to rotatably hold the rolling body;
   c) an attaching potion to attach the holding portion to a front portion of the tractor or a rear portion of the grass collecting machine;
   d) the attaching portion being attached to the front portion of the tractor which tows a roll baler or the rear portion of the grass collecting machine and a line of collected grass is subject to rolling pressure by rolling of the rolling body according to movement of the tractor or the grass collecting machine;
   e) the rolling body is formed in one of the shapes of a cylindrical body or a columnar body;
   f) the holding portion has leg portions hanging at both ends thereof, respectively;
   g) tires are rotatably mounted at the lower ends of the leg portions;
   h) arm portions which swing in accordance with activation of a hydraulic hoist are swingably mounted at both ends of the holding portion and inside of the leg portions; and
   i) the rolling body is rotatably supported on a shaft at both ends of the arm portions.

6. The auxiliary device for harvesting pasture according to claim 5, wherein:
   a) the arm portions are limited to swing within a predetermined extent by an elastic means.

7. The auxiliary device for harvesting pasture according to claim 6, wherein:
   a) a gauge to indicate a distance between the rolling body and the holding portion is mounted with the lower end portion being disposed at the center of a spanning portion to span both the arm portions and the upper end portion slidably penetrating a gauge holding member mounted on the holding portion.

8. The auxiliary device for harvesting pasture according to claim 5, wherein:
   a) the rolling body includes a plurality of tires in parallel.

9. The auxiliary device for harvesting pasture according to claim 5, wherein:
   a) the cylindrical body is made in the form of a metal cylindrical body or the columnar body is made in the form of a metal columnar body.

* * * * *